United States Patent
Richmond et al.

(10) Patent No.: US 9,231,716 B2
(45) Date of Patent: Jan. 5, 2016

(54) METHODS AND APPARATUS FOR GENERATING TWO-TONE CALIBRATION SIGNALS FOR PERFORMING LINEARITY CALIBRATION

(71) Applicant: QUALCOMM Incorporated, San Diego, CA (US)

(72) Inventors: Jesse Aaron Richmond, Oakland, CA (US); Cheng-Han Wang, San Jose, CA (US); Mohammad Bagher Vahid Far, San Jose, CA (US); Yi Zeng, San Jose, CA (US); Jin-Su Ko, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 25 days.

(21) Appl. No.: 14/265,078

(22) Filed: Apr. 29, 2014

(65) Prior Publication Data

US 2015/0311989 A1 Oct. 29, 2015

(51) Int. Cl.
*H04L 27/06* (2006.01)
*H04B 17/21* (2015.01)
*H04L 7/033* (2006.01)

(52) U.S. Cl.
CPC .............. *H04B 17/21* (2015.01); *H04L 7/0331* (2013.01)

(58) Field of Classification Search
CPC ..... H04L 12/2602; H04L 27/148; H03L 7/10; H03L 7/20; G01R 23/20; H01P 1/213; H04B 17/21; H04B 1/10; H04N 5/50; G01S 1/304; H03B 23/00; Y10S 84/18
USPC ......... 375/219, 285, 295, 296, 297, 316, 344, 375/345, 346; 455/73, 88
See application file for complete search history.

(56) References Cited

U.S. PATENT DOCUMENTS

| | | | | |
|---|---|---|---|---|
| 3,369,176 | A | * | 2/1968 | Palatinus ................. 324/624 |
| 3,411,080 | A | * | 11/1968 | Palatinus ................. 324/624 |
| 3,500,227 | A | * | 3/1970 | Palatinus ................. 331/18 |
| 3,771,060 | A | * | 11/1973 | Wycoff .................. 455/703 |
| 4,229,698 | A | * | 10/1980 | Scharfe, Jr. ............. 375/334 |
| 5,790,071 | A | * | 8/1998 | Silverstein et al. ........ 342/354 |
| 6,636,816 | B1 | | 10/2003 | Dvorak et al. |
| 7,024,331 | B2 | | 4/2006 | Jones et al. |
| 7,847,177 | B2 | | 12/2010 | Thirumoorthy |
| 8,442,470 | B1 | | 5/2013 | Tu et al. |
| 2011/0069744 | A1 | | 3/2011 | Laudel et al. |
| 2011/0218755 | A1 | | 9/2011 | Dhayni |

(Continued)

FOREIGN PATENT DOCUMENTS

WO WO-9957820 A1 11/1999

OTHER PUBLICATIONS

International Search Report and Written Opinion—PCT/US2015/025518—ISA/EPO—Jul. 1, 2015.

*Primary Examiner* — Tesfaldet Bocure
(74) *Attorney, Agent, or Firm* — Patterson & Sheridan, L.L.P.

(57) ABSTRACT

Certain aspects of the present disclosure provide methods and apparatus for generating a two-tone signal for performing linearity calibration of a radio frequency (RF) circuit. One example apparatus generally includes a tone generating circuit configured to generate a first single-tone signal from a digital clock signal and a mixer connected with the tone generating circuit and configured to mix the first single-tone signal with a second single-tone signal to provide a two-tone signal having frequencies at a sum and a difference of frequencies of the first and second single-tone signals.

21 Claims, 10 Drawing Sheets

(56) References Cited

U.S. PATENT DOCUMENTS

| | | | |
|---|---|---|---|
| 2011/0256837 A1* | 10/2011 | McCorkle | 455/78 |
| 2012/0082251 A1 | 4/2012 | Vanden Bossche | |
| 2014/0120857 A1* | 5/2014 | Da Silva et al. | 455/307 |

* cited by examiner

METHODS AND APPARATUS FOR GENERATING TWO-TONE CALIBRATION SIGNALS FOR PERFORMING LINEARITY CALIBRATION

TECHNICAL FIELD

Certain aspects of the present disclosure generally relate to radio frequency (RF) circuits and, more particularly, to generating two-tone calibration signals for performing linearity calibration of an RF circuit.

BACKGROUND

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1xRTT (1 times Radio Transmission Technology, or simply 1x), W-CDMA (Wideband Code Division Multiple Access), UMTS-TDD (Universal Mobile Telecommunications System—Time Division Duplexing), HSPA (High Speed Packet Access), GPRS (General Packet Radio Service), or EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems. Such multiple access networks may also include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, 3rd Generation Partnership Project (3GPP) Long Term Evolution (LTE) networks, and Long Term Evolution Advanced (LTE-A) networks.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

SUMMARY

Certain aspects of the present disclosure generally relate to generating two-tone calibration signals for performing linearity calibration of a radio frequency front end (RFFE). Certain aspects of the present disclosure generate a two-tone calibration signal from distortion-rich sources in the radio frequency integrated circuit (RFIC) (e.g., crystal clock references) without containing excessive amounts of distortion products that would prevent the operation of the calibration scheme.

Certain aspects of the present disclosure provide a method for calibrating a receive path for wireless communications. The method generally includes generating a first single-tone signal from a digital clock signal, in an apparatus having the receive path; and mixing the first single-tone signal with a second single-tone signal to provide a two-tone signal having frequencies at a sum and a difference of frequencies of the first and second single-tone signals.

Certain aspects of the present disclosure provide an apparatus for wireless communications. The apparatus generally includes a tone generating circuit configured to generate a first single-tone signal from a digital clock signal and a mixer connected with the tone generating circuit and configured to mix the first single-tone signal with a second single-tone signal to provide a two-tone signal having frequencies at a sum and a difference of frequencies of the first and second single-tone signals.

According to certain aspects, the tone generating circuit includes a harmonic rejection circuit configured to perform harmonic rejection on the digital clock signal to remove the $3^{rd}$ and the $5^{th}$ harmonics from the digital clock signal. For certain aspects, the tone generating circuit further includes a clock generating circuit configured to generate a plurality of phase-shifted clock signals from the digital clock signal, wherein the harmonic rejection is performed on the plurality of phase-shifted clock signals. For certain aspects, the tone generating circuit also includes a low-pass filter configured to filter out at least the $9^{th}$ and higher harmonics of the digital clock signal. For certain aspects, the tone generating circuit further includes a notch filter configured to reject the $7^{th}$ harmonic of the digital clock signal.

According to certain aspects, the first single-tone signal has a frequency in a range from 1 MHz to 5 MHz. The second single-tone signal may have a frequency in a range from 700 MHz to 4 GHz.

According to certain aspects, the apparatus further includes a transmit path having a phase-locked loop (PLL) configured to generate the second single-tone signal.

According to certain aspects, the apparatus further includes a receive path having a low noise amplifier (LNA) and a processing system configured to calibrate a linearity of the receive path using the two-tone signal. The two-tone signal may be routed to an input of the LNA.

According to certain aspects, the mixer is a linear active mixer.

According to certain aspects, the digital clock signal is a reference clock signal for the apparatus.

Certain aspects of the present disclosure provide an apparatus for wireless communications. The apparatus generally includes means for generating a first single-tone signal from a digital clock signal and means for mixing the first single-tone signal with a second single-tone signal to provide a two-tone signal having frequencies at a sum and a difference of frequencies of the first and second single-tone signals.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. These various standards are known in the art.

An Example Wireless System

Figure 1:
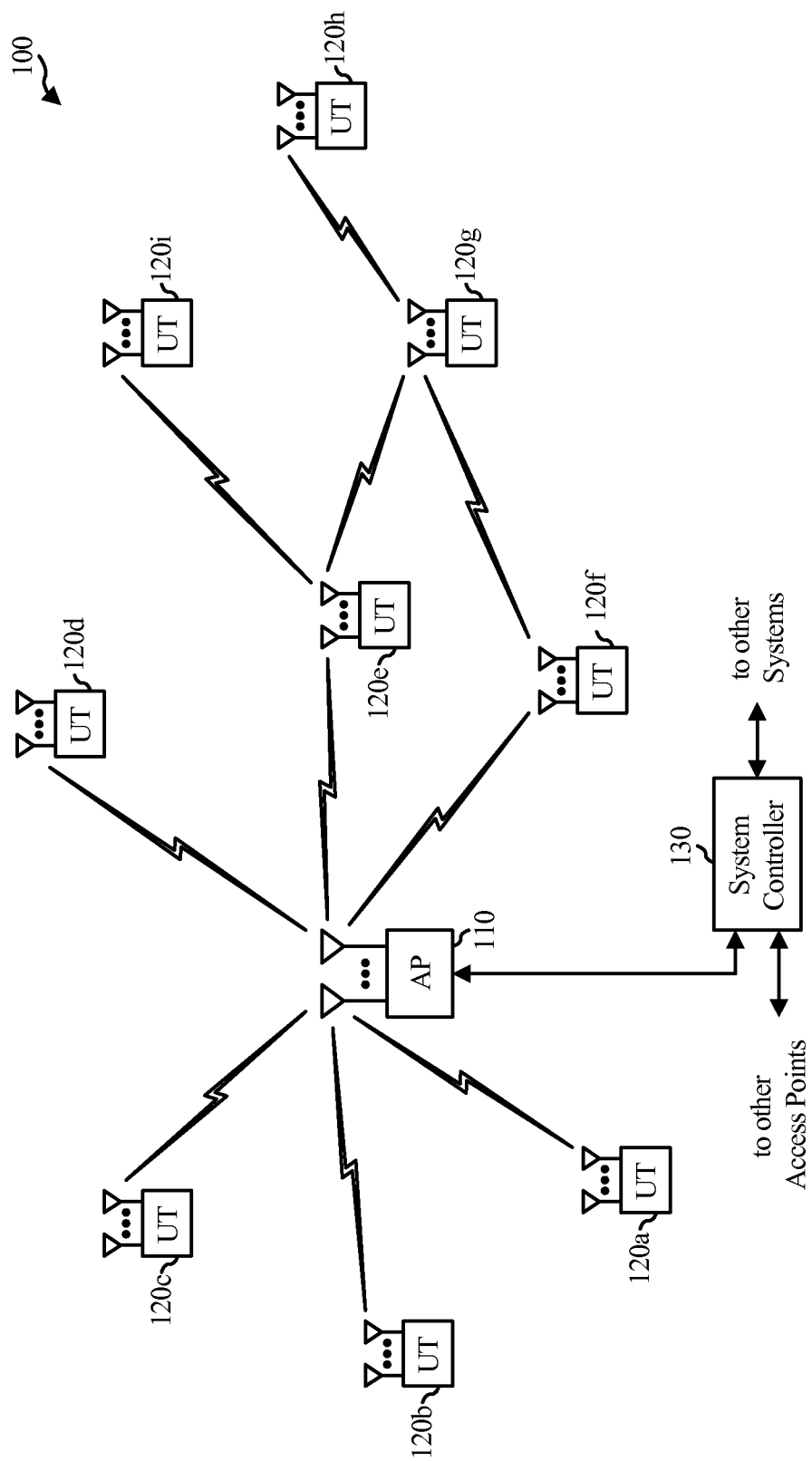
FIG. 1 is a diagram of an example wireless communications network in accordance with certain aspects of the present disclosure.

FIG. 1 illustrates a wireless communications system 100 with access points and user terminals. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
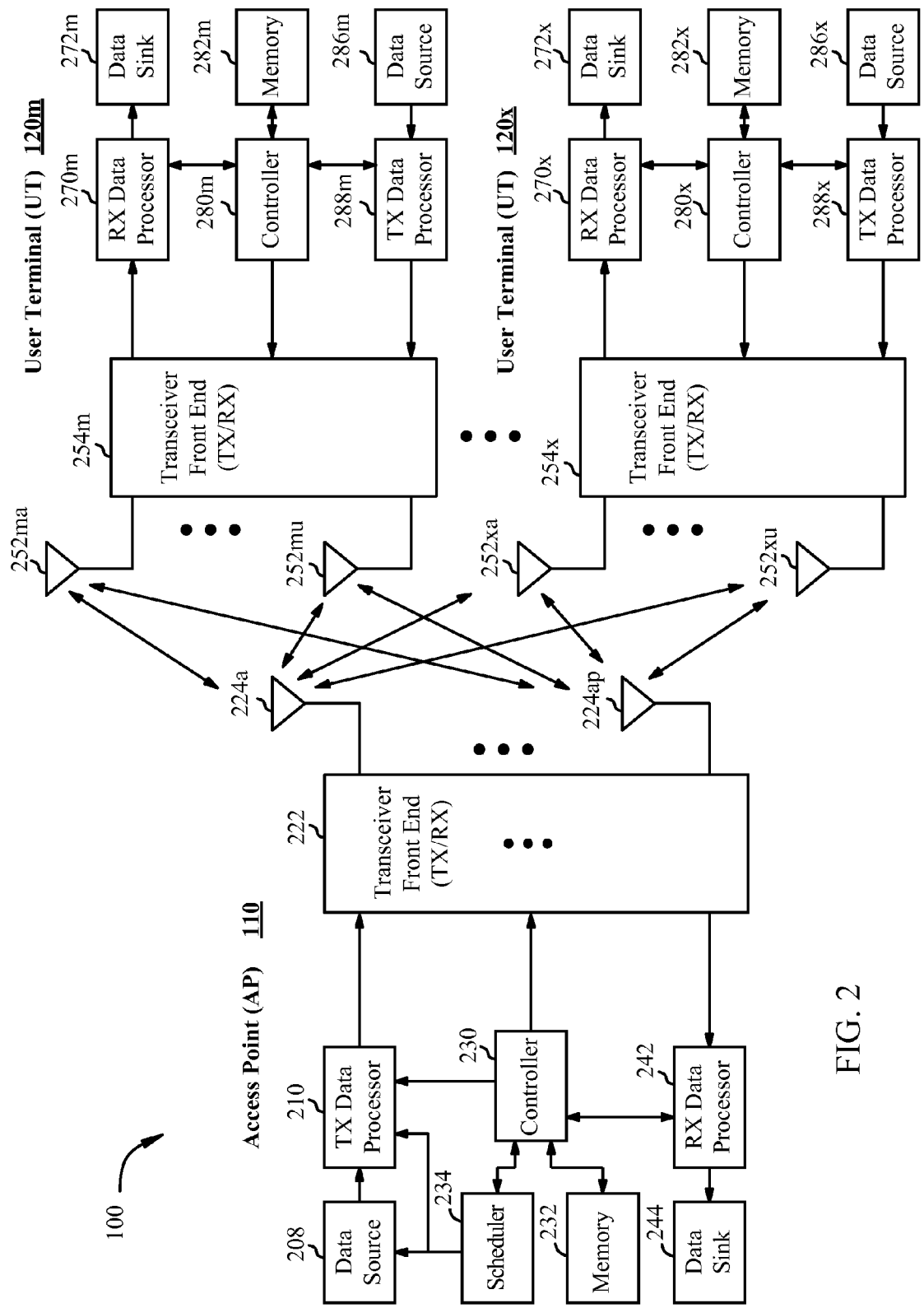
FIG. 2 is a block diagram of an example access point (AP) and example user terminals in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, a combination of the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, a combination of the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, TD-SCDMA, and combinations thereof.

Figure 3:
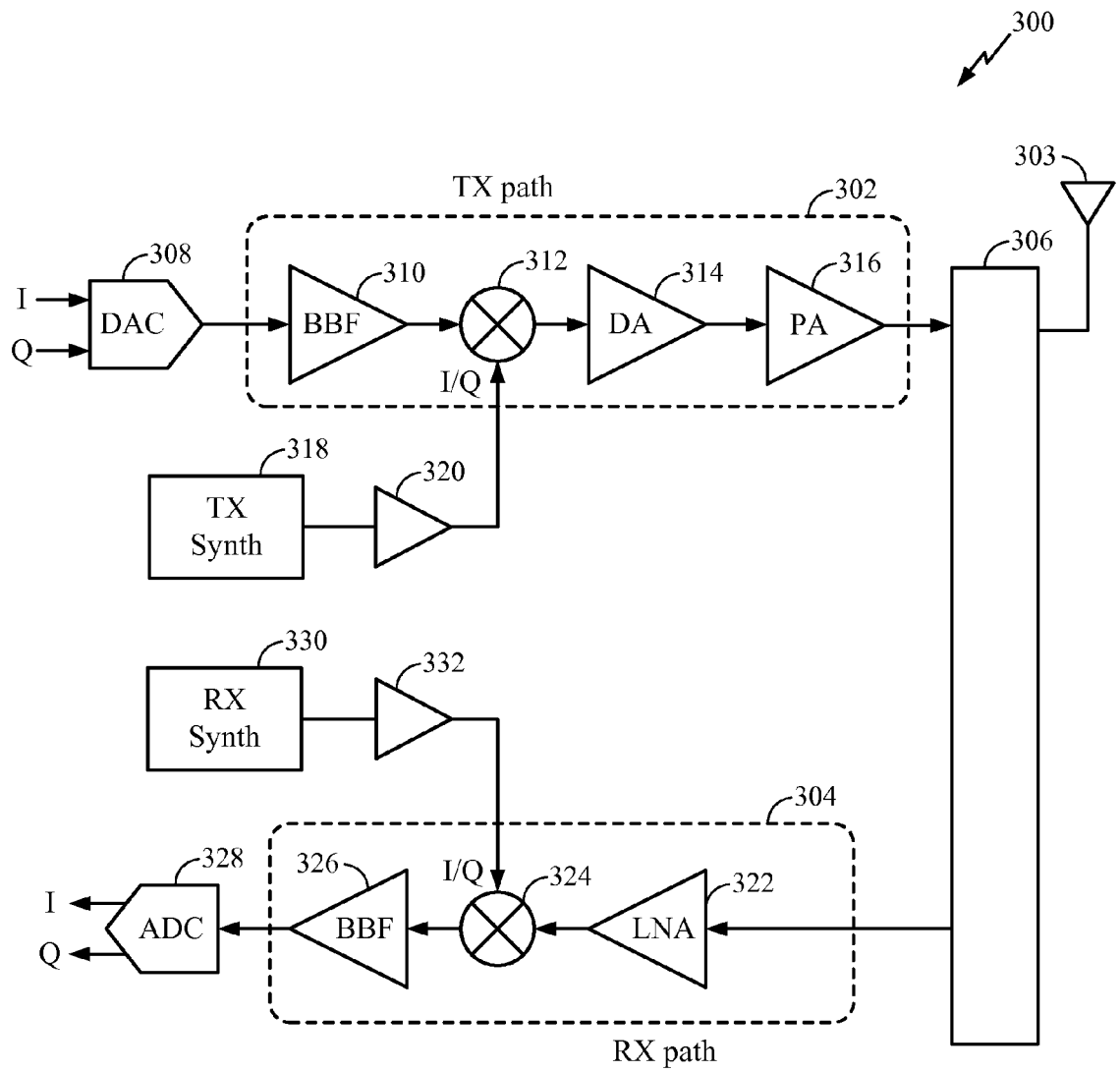
FIG. 3 is a block diagram of an example transceiver front end in accordance with certain aspects of the present disclosure.

FIG. 3 is a block diagram of an example transceiver front end 300, such as transceiver front ends 222, 254 in FIG. 2, in accordance with certain aspects of the present disclosure. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier 316. The BBF 310, the mixer 312, and the DA 314 may be included in a radio frequency integrated circuit (RFIC), while the PA 316 is often external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). Known as heterodyning, this frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which are amplified by the DA 314 and by the PA 316 before transmission by the antenna 303.

The RF path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies indicates using a variable-frequency oscillator, which involves compromises between stability and tunability. Contemporary systems employ frequency synthesizers with a voltage-controlled oscillator (VCO) to generate a stable, tunable LO with a particular tuning range. Thus, the transmit LO is typically produced by a TX frequency synthesizer 318, which may be buffered or amplified by amplifier 320 before being mixed with the baseband signals in the mixer 312. Similarly, the receive LO is typically produced by an RX frequency synthesizer 330, which may be buffered or amplified by amplifier 332 before being mixed with the RF signals in the mixer 324.

Example Two-Tone Signal Generator

Calibrating second-order nonlinearity is a desirable technique for improving RF circuit performance, allowing receivers to cope with interference, both external and from transmitter (TX) leakage. In order to perform calibration, either one or two sinusoidal tones may be presented to the radio frequency front end (RFFE), which produces nonlinear byproducts that can be detected and used to calibrate the RFFE. Since it is difficult to produce a pure tone having only a single frequency without any harmonics, a "tone" as used herein generally refers to a signal characterized by a single specific frequency, where harmonics are at least 20 dB down from the amplitude of the fundamental frequency. While a single tone generator may provide an on-chip calibration signal, this signal may only be useful for second-order intermediate frequency product (IM2) calibration. Also, a single tone produces a distortion product at DC, which is cumbersome to detect.

In contrast, two tones produce a distortion product at the difference in their frequencies, moving IM2 distortion away from DC, which is easier to detect and reduces offset and flicker noise impacts. Using two tones also allows third-order intermediate frequency product (IM3) calibration to be performed, for technologies like Long Term Evolution (LTE) frequency division duplex (FDD) with strong TX interference.

As one solution, an external two-tone source may be applied in the factory for calibration. However, this solution does not provide an on-chip calibration signal and may involve returning to the manufacturer or a calibration lab for re-calibration.

In a second solution, a DAC and a look-up table (LUT) may be used to generate a two-tone signal, and the existing BBF 310, mixer 312, and amplifiers 314, 316 can upconvert to RF to produce an on-chip calibration signal that may be routed to the RX path 304 for performing calibration. However, layout may be difficult due to the separation distance between the TX path 302 and the RX path 304, which is typically employed for isolation between the TX/RX paths. Furthermore, adding an extra path to the TX increases its parasitic loading and may strongly impact the TX performance, which is undesirable during calibration.

In a third solution, two extra PLLs may be used to generate one signal each, which may be summed in a power combiner. However, the close spacing implicated for IM2 calibration may likely introduce PLL pulling and may lead to injection locking. This solution also entails additional hardware, cost, area, and power consumption, along with the RF combiner.

In a fourth solution, harmonic rejection may be used to remove tones. However, typical harmonic rejection removes only the $3^{rd}$ and $5^{th}$ harmonics, but additional harmonics can negatively impact calibration. Filters may be employed to remove $7^{th}$ and higher harmonics, but this consumes increased area.

Accordingly, what is needed are techniques and apparatus for generating a high quality two-tone on-chip linearity calibration signal, ideally with minimized harmonics to ensure a proper calibration signal and with minimal cost, area, and power consumption.

Certain aspects of the present disclosure provide a two-tone signal generator for producing a high quality two-tone signal for performing linearity calibration, which may utilize existing components in an RFIC to minimize area, cost, and design time overhead. This two-tone calibration signal may be generated from distortion-rich sources in the RFIC, such as the crystal clock reference, without containing excessive amounts of distortion products that may prevent the operation of the calibration scheme.

Figures 4A, 4B:
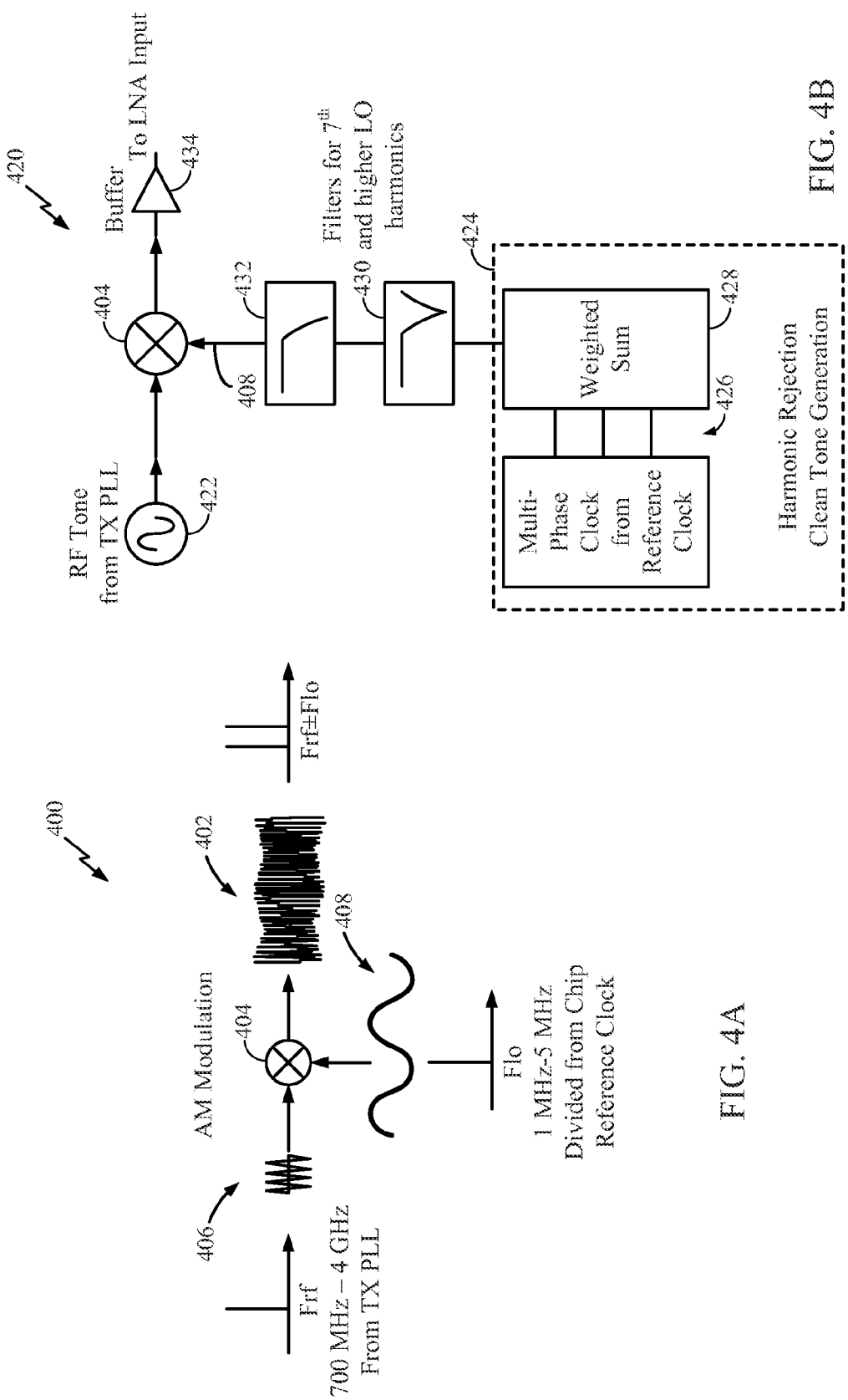
FIG. 4A illustrates generating a two-tone signal by mixing two single-tone signals, in accordance with certain aspects of the present disclosure.
FIG. 4B is a block diagram of an example two-tone signal generating circuit, in accordance with certain aspects of the present disclosure.

As illustrated in the conceptual diagram 400 of FIG. 4A, a two-tone signal 402 may be derived using amplitude modulation (AM), by implementing a mixer 404 whose input signal 406 comes from the main phase-locked loop (PLL) of a radio (e.g., in the TX synthesizer 318), mixed with a local oscillator (LO) signal 408 generated from a divided version of the main crystal reference. The modulation clock derived from the crystal reference clock is a full-rail digital clock signal, rich in harmonics. For example, the frequency of the input signal 406 (Frf) from the TX PLL 422 may be in a range from 700 MHz to 4 GHz inclusive as illustrated, although this range serves only as an example and may include any suitable radio frequency. The frequency of the LO signal 408 (Flo) may be in a range from 1 MHz to 5 MHz inclusive, although this example range may include any desired frequency to generate a beat frequency at the output of the mixer 404.

Figure 5:
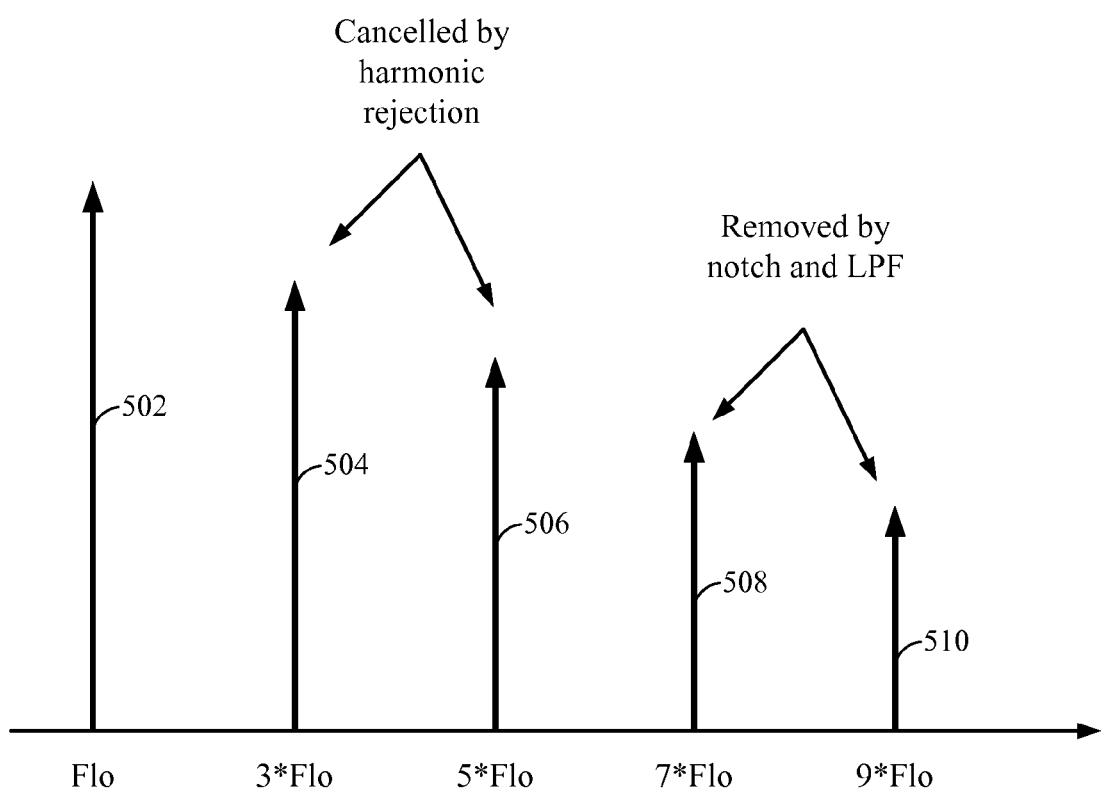
FIG. 5 illustrates example harmonics in a clock signal, in accordance with certain aspects of the present disclosure.
Figure 6:
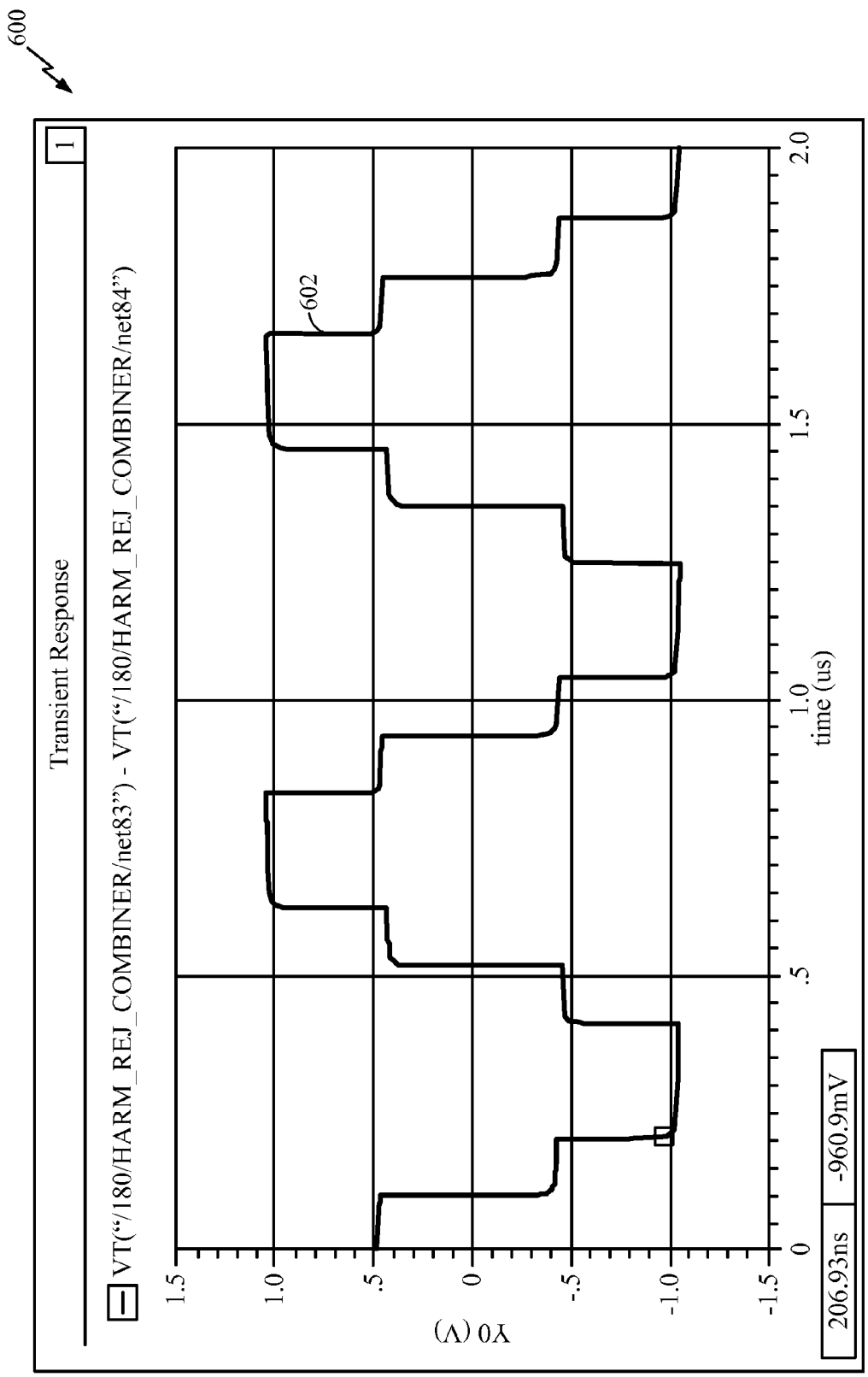
FIG. 6 illustrates an example signal in the local oscillator (LO) path of the two-tone signal generating circuit of FIG. 4B, after harmonic rejection, in accordance with certain aspects of the present disclosure.

This amplitude modulation produces two tones separated by twice the LO frequency (Flo) (i.e., at Frf ±Flo), along with harmonics of both the LO and PLL frequencies. To reduce these harmonics in the LO signal, a harmonic rejecting circuit 424 may be used, as illustrated in the block diagram 420 of FIG. 4B for a two-tone signal generating circuit. In the harmonic rejecting circuit 424, multi-phase clock signals 426 may be generated from the reference clock using a flip-flop-based divide-by-8 circuit, for example. The multi-phase clock signals 426 are combined using a weighted summing circuit 428 to cancel the $3^{rd}$ and $5^{th}$ harmonics 504, 506, as illustrated in FIG. 5. FIG. 6 is a graph 600 of an example signal 602 in the LO path of the block diagram 420 of FIG. 4B, after harmonic rejection by the harmonic rejecting circuit 424.

Figure 7:
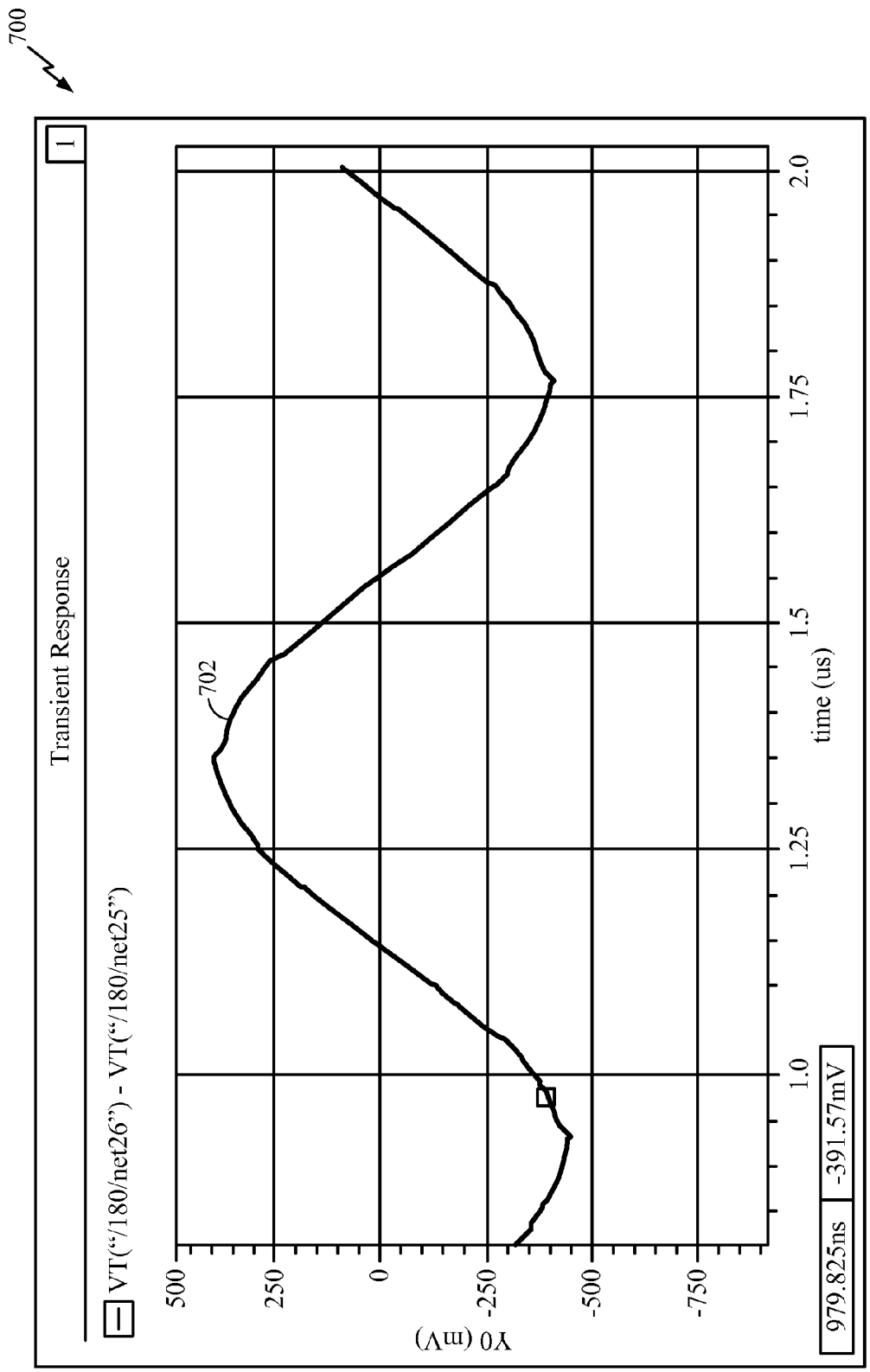
FIG. 7 illustrates an example signal in the LO path after harmonic rejection and filtering, in accordance with certain aspects of the present disclosure.

Returning to FIG. 4B, the LO signal produced from the harmonic rejecting circuit 424 may be filtered to reduce the higher harmonics. For example, the LO signal may be filtered by a notch filter 430 to remove the $7^{th}$ harmonic 508 and by a low-pass filter (LPF) 432 to remove the $9^{th}$ harmonic 510 and higher harmonics. In this manner, the LPF 432 may be smaller in area and involve fewer poles than if similar frequency rejection amounts were achieved without the notch filter. In other words, this minimizes area by moving filter poles to higher frequencies, which leads to smaller passive components. FIG. 7 is a graph 700 of an example signal 702 in the LO path of the block diagram 420 of FIG. 4B, after harmonic rejection, notch filtering, and low pass filtering, which is much cleaner than the signal 602 in FIG. 6. The clean LO signal 408 produced after filtering is then used to drive the mixer 404 (e.g., a linear active mixer), producing a two-tone calibration signal 402 with greatly reduced harmonics. The two-tone calibration signal 402 may be buffered by buffer 434 and routed to the input of the LNA 322 for performing linearity calibration.

For certain aspects, a second notch filter may be used to remove the $9^{th}$ harmonic, with the LPF 432 removing the $11^{th}$ and higher harmonics. However, this may unnecessarily consume additional area compared to the solution shown in FIG. 4B.

Figure 8:
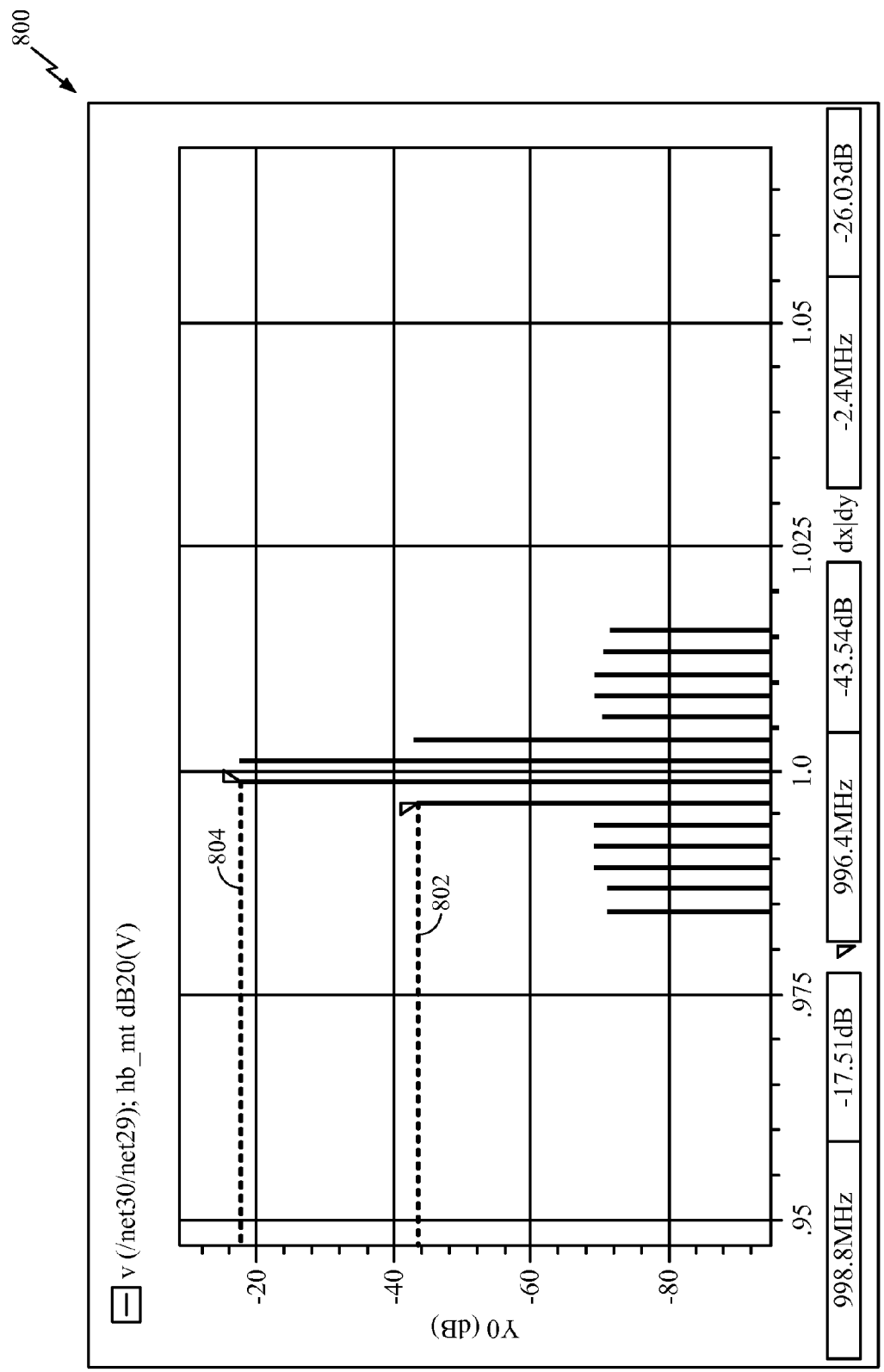
FIG. 8 is an example graph of amplitude versus frequency for an example output of the two-tone signal generating circuit, in accordance with certain aspects of the present disclosure.

FIG. 8 is a graph 800 of amplitude versus frequency for an example output signal 402 of the block diagram 420 of the two-tone signal generating circuit of FIG. 4B, in accordance with certain aspects of the present disclosure. The graph 800 illustrates that after mixing the RF tone from the TX PLL 422 with the clean LO signal 408, the harmonic 802 (at 996.4 MHz) has an amplitude about 26 dB lower (−17.51 dB-−43.54 dB) than the fundamental tone 804 at Frf−Flo (e.g., 998.8 MHz). Higher harmonics are about 50 dB lower than the fundamental tone 804, illustrating that the signal produced is a clean two-tone signal suitable for linearity calibration.

The advantages of this technique include an easier method of implementing calibration by moving the observable signal away from DC, and a method of generating a strong, clean two-tone signal from only a single PLL and the standard crystal clock, which are existing, low-noise clock sources. This solution involves low overhead and may consume an additional area of only 100 μm×100 μm in the RFIC. The harmonic rejection removes lower harmonics, while the small filters 430, 432 remove higher harmonics. By using the TX PLL 422 (which is isolated from the RX path) to generate the two-tone signal, this solution is also immune to LO leakage.

Figure 9:
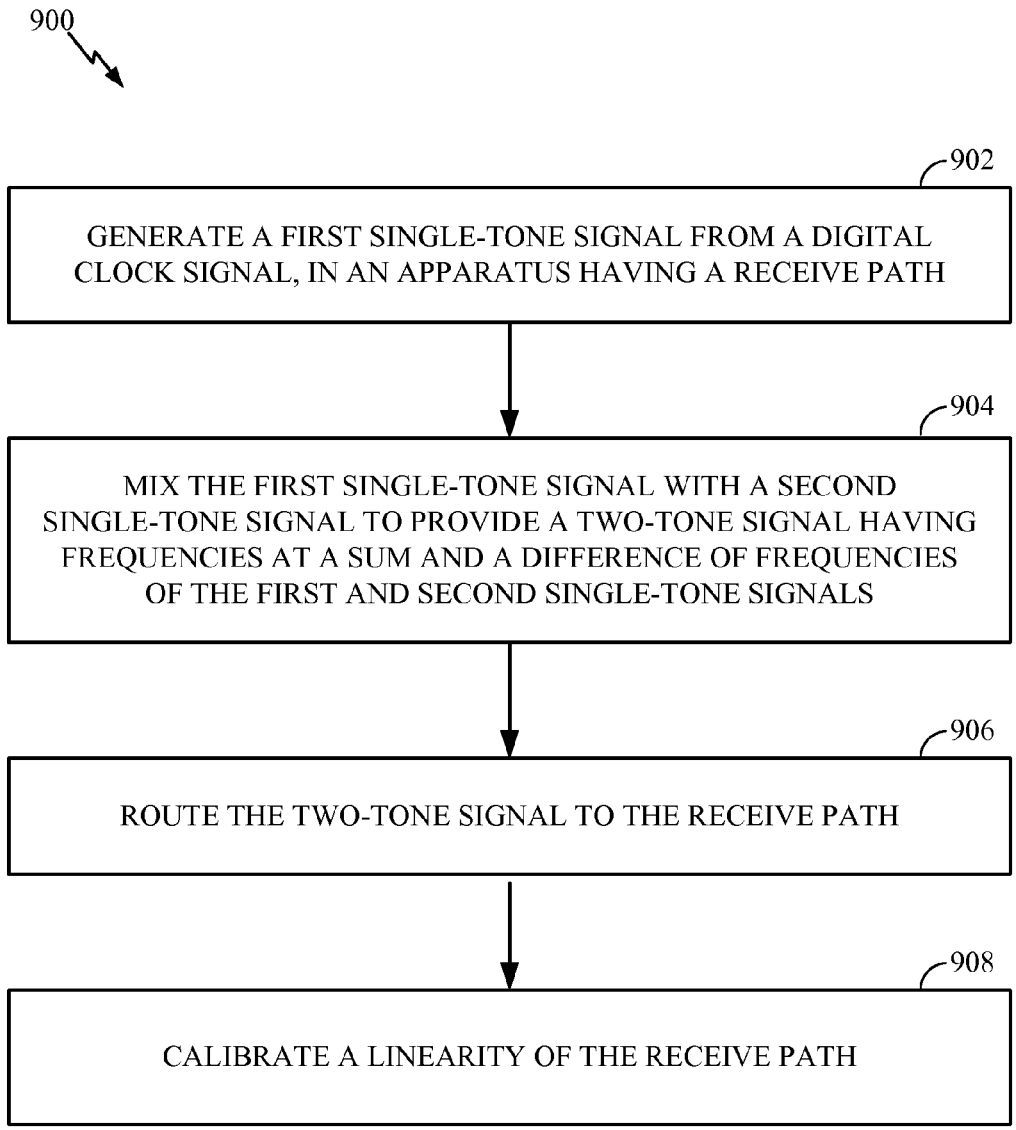
FIG. 9 is a flow diagram of example operations for calibrating a receive path for wireless communications, in accordance with certain aspects of the present disclosure.

FIG. 9 is a flow diagram of example operations 900 for calibrating a receive path for wireless communications, in accordance with certain aspects of the present disclosure. The operations 900 may begin, at 902, by generating a first single-tone signal from a digital clock signal, in an apparatus having the receive path. At 904, the first single-tone signal may be mixed with a second single-tone signal to provide a two-tone signal having frequencies at a sum and a difference of frequencies of the first and second single-tone signals.

According to certain aspects, the generating at 902 involves performing harmonic rejection on the digital clock signal to remove the $3^{rd}$ and the $5^{th}$ harmonics from the digital clock signal. In this case, the operations 900 may further include generating a plurality of phase-shifted clock signals from the digital clock signal. The harmonic rejection is performed on the plurality of phase-shifted clock signals. For certain aspects, the generating at 902 further involves low-pass filtering at least the $9^{th}$ and higher harmonics of the digital clock signal. For example, the $7^{th}$ and higher harmonics of the digital clock signal may be low-pass filtered. For certain aspects, the generating at 902 further includes notch filtering the $7^{th}$ harmonic of the digital clock signal.

According to certain aspects, the first single-tone signal has a frequency in a range from 1 MHz to 5 MHz.

According to certain aspects, the second single-tone signal has a frequency in a range from 700 MHz to 4 GHz.

According to certain aspects, the operations 900 further include generating the second single-tone signal using a phase-locked loop (PLL) for a transmit path in the apparatus.

According to certain aspects, the operations 900 further include routing the two-tone signal to the receive path at 906. For certain aspects, the routing at 906 may involve routing the two-tone signal to an input of a low noise amplifier (LNA) in the receive path.

According to certain aspects, the operations 900 further include calibrating a linearity of the receive path at 908 using the two-tone signal routed thereto.

Figure 10:
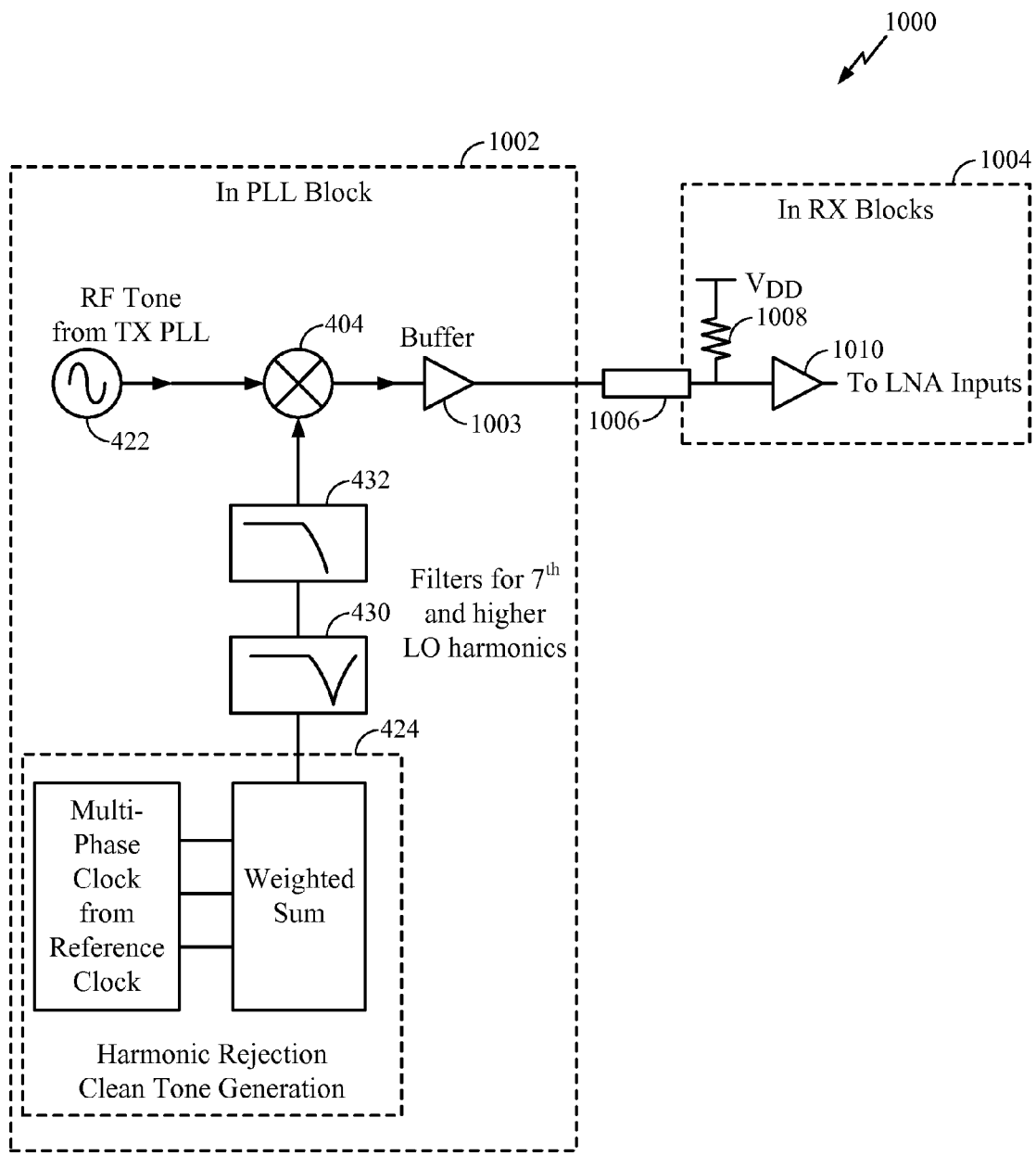
FIG. 10 is a block diagram illustrating an example extension to the example two-tone signal generating circuit of FIG. 4B, in accordance with certain aspects of the present disclosure.

FIG. 10 is a block diagram 1000 illustrating an example extension to the example two-tone signal generating circuit of FIG. 4B, in accordance with certain aspects of the present disclosure. The components in the block diagram 420 of FIG. 4B may be located in the RFIC in the PLL block 1002, where the buffer 434 may be an open drain buffer 1003. To perform calibration in the RX path 304, the open drain buffer 1003 may be connected to a transmission line 1006 routed to another buffer 1010, with a pull-up resistor 1008 at the end of the transmission line 1006. The pull-up resistor 1008 and buffer 1010 may be located in an RX block 1004 of the RFIC, along with the RX path 304.

The various operations or methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for receiving may comprise a receiver (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for generating, means for mixing, means for combining, means for routing, or means for calibrating may comprise components in the block diagrams 420, 1000 of FIGS. 4B and 10. Means for processing, means for calibrating, or means for determining may comprise a processing system, which may include one or more processors, such as the RX data processor 270, the TX data processor 288, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for calibrating a receive path for wireless communications, comprising:
   generating a first single-tone signal from a digital clock signal, in an apparatus having the receive path; and
   mixing the first single-tone signal with a second single-tone signal to provide a two-tone signal having frequencies at a sum and a difference of frequencies of the first and second single-tone signals.

2. The method of claim 1, wherein the generating comprises performing harmonic rejection on the digital clock signal to remove the $3^{rd}$ and the $5^{th}$ harmonics from the digital clock signal.

3. The method of claim 2, further comprising generating a plurality of phase-shifted clock signals from the digital clock signal, wherein the harmonic rejection is performed on the plurality of phase-shifted clock signals.

4. The method of claim 2, wherein the generating further comprises low-pass filtering at least the $9^{th}$ and higher harmonics of the digital clock signal.

5. The method of claim 4, wherein the generating further comprises notch filtering the $7^{th}$ harmonic of the digital clock signal.

6. The method of claim 1, wherein the first single-tone signal has a frequency in a range from 1 MHz to 5 MHz.

7. The method of claim 1, wherein the second single-tone signal has a frequency in a range from 700 MHz to 4 GHz.

8. The method of claim 1, further comprising generating the second single-tone signal using a phase-locked loop (PLL) for a transmit path in the apparatus.

9. The method of claim 1, further comprising:
   routing the two-tone signal to an input of a low noise amplifier (LNA) in the receive path; and
   calibrating a linearity of the receive path.

10. An apparatus for wireless communications, comprising:
    a tone generating circuit configured to generate a first single-tone signal from a digital clock signal; and
    a mixer connected with the tone generating circuit and configured to mix the first single-tone signal with a second single-tone signal to provide a two-tone signal having frequencies at a sum and a difference of frequencies of the first and second single-tone signals.

11. The apparatus of claim 10, wherein the tone generating circuit comprises a harmonic rejection circuit configured to perform harmonic rejection on the digital clock signal to remove the $3^{rd}$ and the $5^{th}$ harmonics from the digital clock signal.

12. The apparatus of claim 11, wherein the tone generating circuit further comprises a clock generating circuit configured to generate a plurality of phase-shifted clock signals from the digital clock signal, wherein the harmonic rejection is performed on the plurality of phase-shifted clock signals.

13. The apparatus of claim 11, wherein the tone generating circuit further comprises a low-pass filter configured to filter out at least the $9^{th}$ and higher harmonics of the digital clock signal.

14. The apparatus of claim 13, wherein the tone generating circuit further comprises a notch filter configured to reject the $7^{th}$ harmonic of the digital clock signal.

15. The apparatus of claim 10, wherein the first single-tone signal has a frequency in a range from 1 MHz to 5 MHz.

16. The apparatus of claim 10, wherein the second single-tone signal has a frequency in a range from 700 MHz to 4 GHz.

17. The apparatus of claim 10, further comprising a transmit path having a phase-locked loop (PLL) configured to generate the second single-tone signal.

18. The apparatus of claim 10, further comprising:
    a receive path having a low noise amplifier (LNA), wherein the two-tone signal is routed to an input of the LNA; and
    a processing system configured to calibrate a linearity of the receive path using the two-tone signal.

19. The apparatus of claim 10, wherein the mixer comprises a linear active mixer.

20. The apparatus of claim 10, wherein the digital clock signal is a reference clock signal for the apparatus.

21. An apparatus for wireless communications, comprising:
- means for generating a first single-tone signal from a digital clock signal; and
- means for mixing the first single-tone signal with a second single-tone signal to provide a two-tone signal having frequencies at a sum and a difference of frequencies of the first and second single-tone signals.

* * * * *